US006243654B1

(12) United States Patent
Johnson et al.

(10) Patent No.: US 6,243,654 B1

(45) Date of Patent: Jun. 5, 2001

(54) TRANSDUCER ASSEMBLY WITH SMART CONNECTOR

(75) Inventors: Robert N. Johnson, Silver Spring, MD (US); Stanley P. Woods, Santa Clara, CA (US)

(73) Assignee: Telemonitor, Inc., Columbia, MA (US)

( * ) Notice: Subject to any disclaimer, the term of this patent is extended or adjusted under 35 U.S.C. 154(b) by 0 days.

(21) Appl. No.: 09/167,465

(22) Filed: Oct. 7, 1998

Related U.S. Application Data

(60) Provisional application No. 60/061,391, filed on Oct. 7, 1997.

(51) Int. Cl.[7] .......................... G01D 18/00; G01P 21/00; H01R 13/66

(52) U.S. Cl. ............................ 702/85; 702/104; 439/620

(58) Field of Search ................................ 702/33–35, 47, 702/52–54, 57, 85, 91, 104, 116–118, 124, 126, 182, 183–185, 189, 198, FOR 103, 123–125, 134, 135, 156–163; 73/1.01, 1.59, 1.88; 439/620

(56) References Cited

U.S. PATENT DOCUMENTS

| | | | |
|---|---|---|---|
| 4,303,984 | 12/1981 | Houvig | 702/104 |
| 4,313,509 | 2/1982 | Engels | 177/50 |
| 4,418,392 | 11/1983 | Hata | 702/91 |
| 4,592,002 | 5/1986 | Bozarth, Jr. et al. | 702/107 |
| 4,611,304 | 9/1986 | Butenko et al. | 702/58 |
| 4,831,558 | 5/1989 | Shoup et al. | 702/188 |
| 4,845,649 | 7/1989 | Eckardt et al. | 702/104 |
| 4,858,615 | 8/1989 | Meinema | 600/481 |
| 4,868,476 | 9/1989 | Respaut | 318/632 |
| 5,014,229 | 5/1991 | Mofachern | 702/106 |
| 5,071,065 | 12/1991 | Aalto et al. | 236/49.3 |
| 5,089,979 | 2/1992 | McEachern et al. | 702/91 |
| 5,122,970 | 6/1992 | Gilbert et al. | 702/33 |
| 5,135,002 | 8/1992 | Kirchner et al. | 600/485 |
| 5,176,544 | 1/1993 | AbuJudom, II et al. | 439/87 |

(List continued on next page.)

OTHER PUBLICATIONS

Sensor, Smart I/O and IEEE 1451, CrossNet Wireless website, 2000.

Johnson, "Why Does this Industry Need a Smart Sensor Standard?", *Forming and Febricating*, one page, Jan. 1998.

Johnson, "Building Plug–and–Play Networked Smart Transducers," *Sensors*, Oct. 1997.

Analog Devices Brochure, one page, May 19, 1998.

Solartron Digital Probe Brochure, 10 pages, received Oct. 15, 1998.

*Primary Examiner*—Marc S. Hoff
*Assistant Examiner*—Manuel L. Barbee

(57) ABSTRACT

A transducer assembly for connection with a digital signal processing system includes an analog transducer, a digital connector assembly movable relative to the analog transducer to facilitate connection with the digital signal processing system, and a cable permanently affixed between the analog transducer and the digital connector assembly to convey an analog transducer signal therebetween. The digital connector assembly includes a connector housing, a digital connector mounted by the connector housing to mate in a detachable manner with the digital signal processing system, and transducer interface circuitry disposed within the connector housing in a non-removable manner and including a digital storage device programmed to store digital transducer data, such as transducer identification, configuration settings and calibration or correction factors, for retrieval by the digital signal processing system. The transducer interface circuitry can also include signal conditioning circuitry and a microcontroller. Incorporating the transducer data memory and interface circuitry in the connector housing allows conventional transducers to be used without modifying existing mounting techniques and, at the same time, provides traceability of the transducer and its calibration data.

20 Claims, 7 Drawing Sheets

U.S. PATENT DOCUMENTS

| | | | |
|---|---|---|---|
| 5,242,215 | 9/1993 | Krause | 363/7 |
| 5,249,143 | 9/1993 | Staley, III | 702/91 |
| 5,293,013 | 3/1994 | Takahashi | 200/51 R |
| 5,387,131 | 2/1995 | Foreman et al. | 439/620 |
| 5,542,296 | 8/1996 | Reidemeister et al. | 73/514.32 |
| 5,587,884 | 12/1996 | Raman | 361/728 |
| 5,615,344 | 3/1997 | Corder | 710/129 |
| 5,647,767 | 7/1997 | Scheer et al. | 439/620 |
| 5,660,567 | 8/1997 | Nierlich et al. | 439/620 |
| 5,664,229 | 9/1997 | Bhargava et al. | 710/65 |
| 5,668,698 | 9/1997 | Jozwiak et al. | 361/761 |
| 5,669,775 | 9/1997 | Campbell et al. | 439/77 |

TRANSDUCER ASSEMBLY WITH SMART CONNECTOR

CROSS-REFERENCE TO RELATED APPLICATIONS

This application claims the benefit of U.S. Provisional Patent Application Serial No. 60/061,391, filed on Oct. 7, 1997, the disclosure of which is incorporated herein by reference.

BACKGROUND OF THE INVENTION

1. Field of the Invention

The present invention relates generally to transducers and, more particularly, to a transducer assembly including a smart connector for interfacing with digital signal processing systems such as data acquisition and control systems.

2. Discussion of the Related Art

Transducers are used in a wide variety of applications requiring physical quantities to be converted into analog electrical signals or analog electrical signals to be converted into some type of physical phenomenon. Transducers that normally provide an analog electrical signal as output are called sensors whereas transducers that normally accept an analog electrical signal as input are called actuators. In use, both types of transducer are commonly located remotely of the signal processing equipment receiving or generating the analog electrical signals associated with the transducers so that signals to and from the transducer must usually be carried by wires extending from the transducer to any one of a variety of standard connectors, such as BNC or multi-pin digital connectors. The connectors are configured to mate with the signal processing equipment and will typically transmit the signals directly to the equipment without modification. The signal processing equipment, on the other hand, typically includes interface electronics in the form of analog signal conditioners (e.g., filters, amplifiers, etc.), analog-to-digital (for a sensor) or digital-to-analog (for an actuator) converters, digital communications, and/or non-volatile memory for storing and retrieving information relating to transducer identification, configuration settings and calibration or correction factors to be applied to the signal. In traditional signal processing equipment, such as commercially available data acquisition and control systems, the interface electronics is disposed within a relatively large (e.g., tens of cubic inches) cabinet or housing to which the analog transducer signal wires are connected via a standard connector. The transducer identification, configuration settings and calibration or correction factors, if provided, have heretofore been manually entered into the control or data acquisition equipment. The process of manually entering the aforementioned transducer information into the signal processing equipment is a potential source of errors, particularly if a large number of transducers are used in a system.

Recently, it has been proposed to include the transducer identification, configuration settings and calibration or correction factors in a device known as a Smart Transducer Interface Module (STIM) as defined in the IEEE 1451.2 standard, the contents of which are incorporated herein in their entirety. The IEEE 1451.2 standard requires that the transducer data (known as a Transducer Electronic Data Sheet or TEDS) be inseparable from the transducer itself in all modes of normal operation to maintain the traceability of the transducer identification, configuration, and calibration information, even if the transducers themselves are exchanged at a later time. The foregoing requirement can be met by including the transducer and the interface electronics in the same housing and running a digital signal cable from the STIM to the signal processing system using a standard connector; however, for some classes of transducers (temperature sensors such as thermocouples for example), the interface electronics adds unacceptable size and mass to the transducer. In addition, the IEEE 1451.2 digital signal interface is defined as a ten-wire connection, and routing so large a cable to what may be relatively inaccessible locations may not be practical.

SUMMARY OF THE INVENTION

Accordingly, it is a primary object of the present invention to overcome the abovementioned disadvantages by storing information about the transducer in a digital connector assembly and connecting the transducer to the connector assembly using a fixed analog cable.

Some of the advantages of the present invention are that the transducer assembly can be switched between multiple external digital signal processing systems without the need of having to manually enter information about the transducer each time the transducer assembly is connected to a new external digital signal processing system, that standard transducers and mounting techniques can be used, that cabling costs can be reduced by minimizing the number of wires needed to connect the transducer with the connector, and that equipment costs can be reduced by performing signal processing operations locally.

A first aspect of the present invention is generally characterized in a transducer assembly for connection with a digital signal processing system including an analog transducer, a digital connector assembly movable relative to the analog transducer to facilitate connection with the digital signal processing system, and a cable permanently affixed between the analog transducer and the digital connector assembly to convey an analog transducer signal therebetween. The digital connector assembly includes a connector housing, a digital connector mounted by the connector housing to mate in a detachable manner with the digital signal processing system, and transducer interface circuitry disposed within the connector housing in a non-removable manner and including a digital storage device programmed to store digital transducer data, such as transducer identification, configuration settings and calibration or correction factors, for retrieval by the digital signal processing system. The transducer interface circuitry can also include signal conditioning circuitry and a microcontroller. Incorporating the transducer data memory and interface circuitry in the connector housing allows conventional transducers to be used so that users do not have to modify existing mounting techniques. Furthermore, by using a fixed cable to connect the transducer to the connector assembly, the transducer assembly provides traceability of the transducer and its calibration data.

Another aspect of the present invention is generally characterized in a transducer assembly for connection with an external digital signal processing system including an analog transducer, a digital connector assembly movable relative to the analog transducer to facilitate connection with the digital signal processing system, and a cable permanently affixed between the analog transducer and the digital connector assembly to convey an analog signal therebetween. The digital connector assembly includes a connector housing, a digital connector mounted by the connector housing to mate in a detachable manner with the digital signal processing system, and transducer interface circuitry disposed within the connector housing in a non-removable manner and including a digital storage device programmed to hold digital calibration and correction data for the transducer, signal conditioning means for receiving an analog transducer signal and providing a conditioned analog transducer signal, and a microprocessor for retrieving the calibration and correction data from the digital storage device and generating digital corrections which are applied to the analog transducer signal via the signal conditioning means.

Still another aspect of the present invention is generally characterized in a transducer assembly for connection with an external digital signal processing system including an analog transducer, a digital connector assembly movable relative to the analog transducer to facilitate connection of the transducer assembly to the digital signal processing system, and a cable permanently affixed between the analog transducer and the digital connector assembly to convey one of a conditioned and an unconditioned analog signal therebetween. The digital connector assembly includes a connector housing, a digital connector mounted by the connector housing to mate in a detachable manner with the digital signal processing system, and transducer interface circuitry disposed within the connector housing in a non-removable manner and including signal conditioning means for receiving an analog transducer signal and providing a conditioned analog transducer signal, and converter means for converting between a digital transducer signal and one of the conditioned and unconditioned analog transducer signals.

The foregoing objects and advantages of the present invention can be accomplished individually or in combination. Other objects and advantages of the present invention will become apparent from the following description of the preferred embodiments taken with the accompanying drawings, wherein like parts in each of the several figures are identified by the same reference numerals.

DESCRIPTION OF THE PREFERRED EMBODIMENTS

A transducer assembly or STIM 10 according to the present invention, as shown in FIGS. 1–7, includes an analog transducer 12, a smart connector assembly 14, and a cable 16 disposed between the transducer and the connector assembly to convey an analog electrical signal therebetween. Transducer 12 can include a sensor or an actuator, where by "sensor" is meant a device which provides an analog electrical signal in response to a physical stimulus and by "actuator" is meant a device which causes physical movement or a change in the physical condition of an object in response to an analog electrical signal. Input or output values can be impressed on the analog electrical signal in various ways, for example by varying the voltage, current or frequency of the underlying analog carrier signal.

Figure 1:
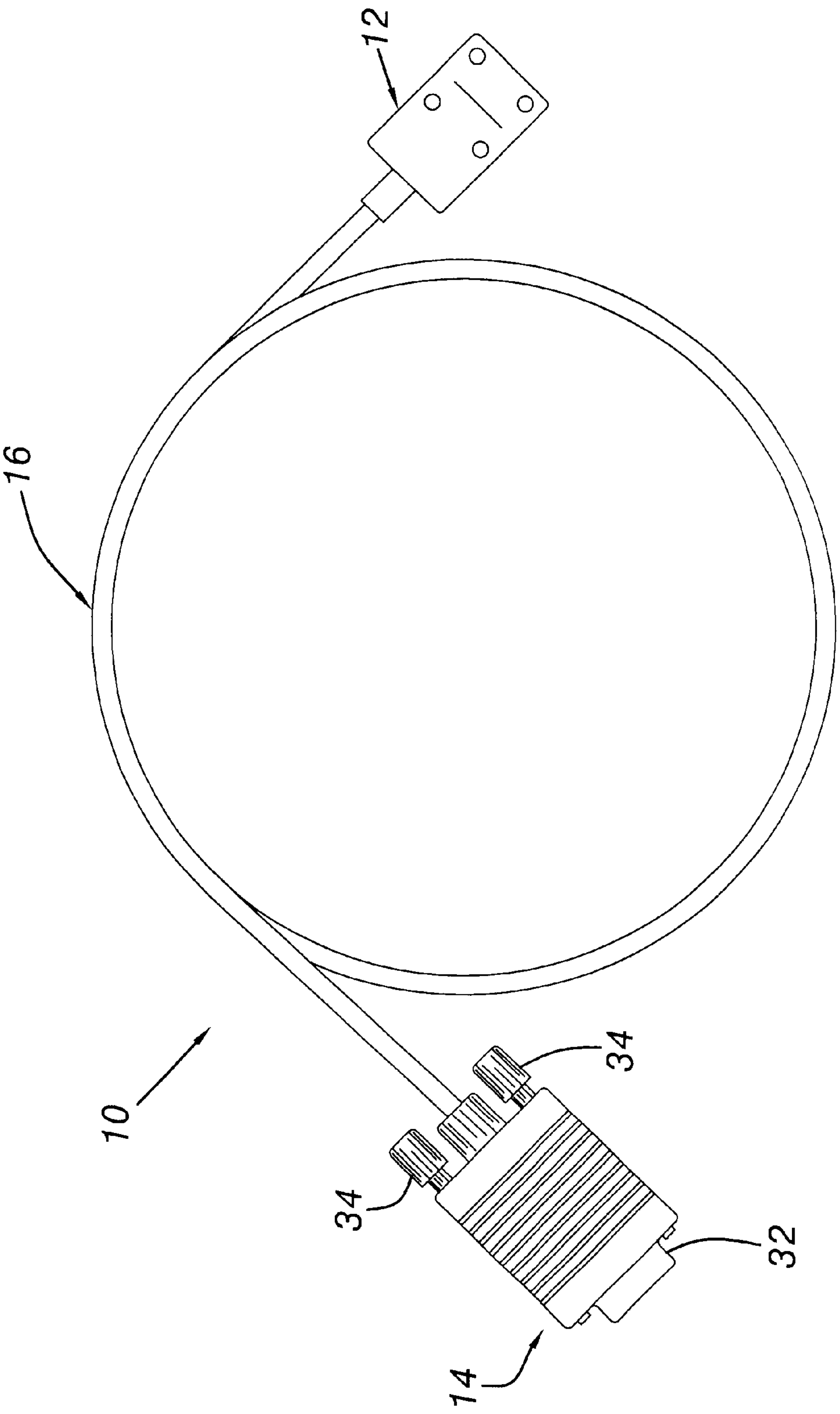
FIG. 1 is a top view of a transducer assembly according to the present invention.
Figures 2, 3, 4, 5, 6, 7:
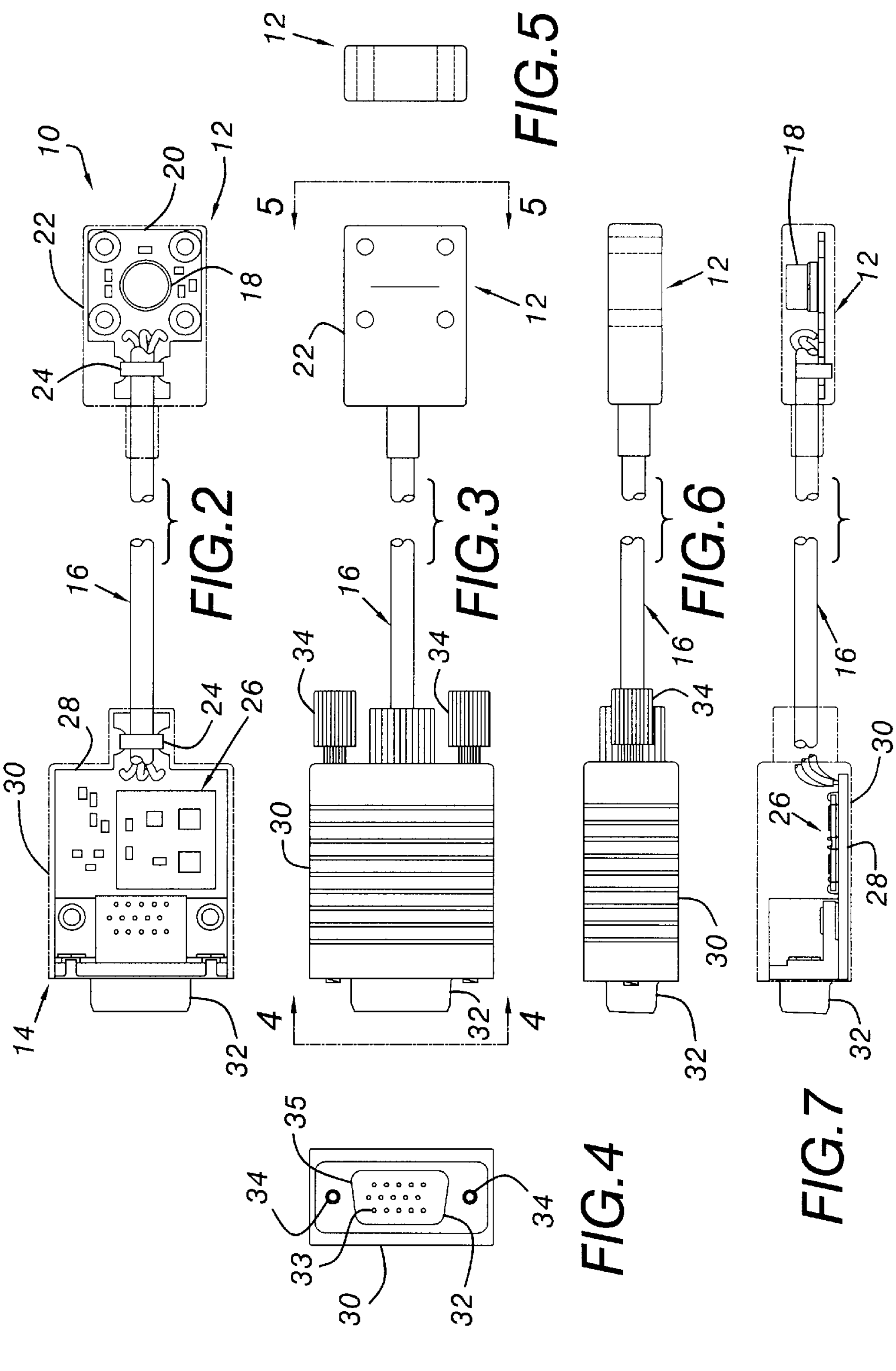
FIG. 2 is a sectional top view, broken longitudinally, of the transducer assembly shown in FIG. 1.
FIG. 3 is a top view, broken longitudinally, of the transducer assembly shown in FIG. 1.
FIG. 4 is an end view of the transducer assembly taken along line 4—4 in FIG. 3.
FIG. 5 is an end view of the transducer assembly taken along line 5—5 in FIG. 3.
FIG. 6 is a side view, broken longitudinally, of the transducer assembly shown in FIG. 3.
FIG. 7 is a sectional side view, broken longitudinally, of the transducer assembly shown in FIG. 3.

Transducer 12 is shown in FIG. 2 as an accelerometer 18 mounted on a printed circuit board 20 within a transducer housing 22. The particular accelerometer shown is a model ADXL-05 accelerometer from Analog Devices of Norwood, Mass.; however, other accelerometers can be used. An accelerometer is a form of sensor since it typically provides an analog electrical signal having a voltage proportional to the rate of acceleration of the object upon which the accelerometer is mounted. While a sensor in the form of an accelerometer is shown, it will be appreciated that other types of sensors can be used including, but not limited to, temperature, pressure or magnetic field sensors. Alternatively or in addition to sensors, the transducer can include actuators such as, for example, electromagnetic, pneumatic, or hydraulic linear actuators and rotary motors.

Cable 16 is shown as a standard four-wire shielded cable extending between transducer 12 and connector assembly 14. The cable is preferably flexible or bendable to permit movement of the connector assembly relative to the transducer, with a length allowing the transducer assembly to be connected to a digital signal processing system, such as data acquisition or control equipment, located remotely of the transducer. As best seen in FIG. 2, cable 16 terminates within transducer housing 22 and is fixed to circuit board 20 by a cable wrap 24, the terminal end of the cable and the board preferably being encapsulated within the transducer housing to form a permanent connection.

Connector assembly 14 includes transducer interface circuitry 26 mounted on a printed circuit board 28 within a housing 30 of generally rectangular or box-like configuration carrying a standard digital connector or plug 32 and mounting screws 34 for securing the connector housing to control or data acquisition equipment. Cable 16 terminates within connector housing 30 and is fixed to circuit board 28 by a cable wrap 24, the terminal end of the cable and the circuit board preferably being encapsulated within housing 30, for example by molding the housing around the cable and the board, to form a permanent connection. As best seen in FIG. 4, plug 32 is a standard subminiature D-shell digital connector having fifteen contacts 33 in the form of pins arranged in three parallel rows of five pins each within a tubular sleeve or shell 35 of generally trapezoidal configuration. Plug 32 protrudes from a side of connector housing 30 opposite cable 16 and is oriented perpendicular to the longitudinal axis of the cable in an unbent condition to provide an in-line connection to digital data acquisition and control equipment.

Figure 8:
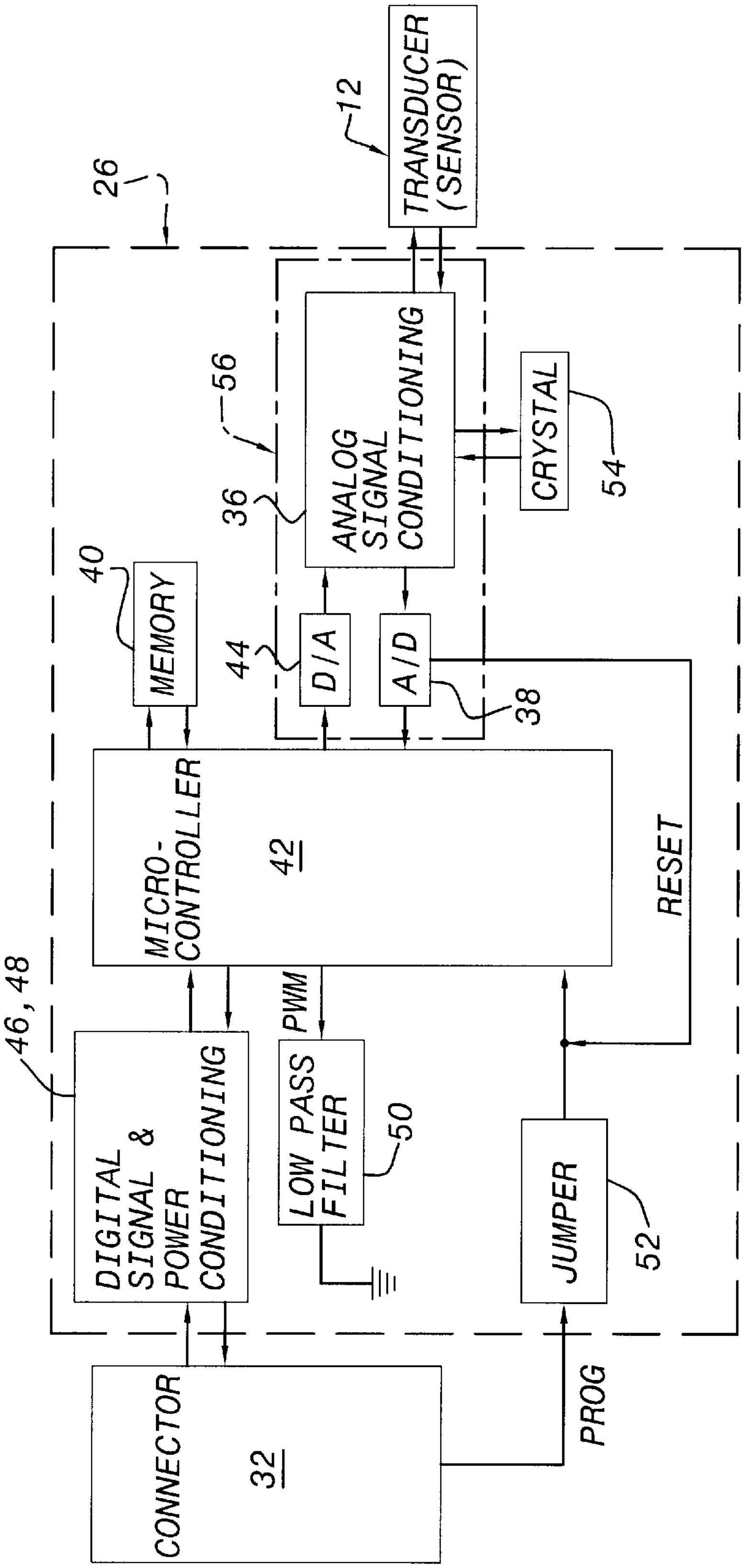
FIG. 8 is a schematic block diagram of a transducer assembly according to the present invention.

As illustrated in FIG. 8, transducer interface circuitry 26 includes analog signal conditioning circuitry 36 for receiving an analog input signal from a transducer and providing a conditioned analog signal, an analog-to-digital converter 38 for converting the conditioned analog signal to a digital signal, a digital storage device or memory 40 for storing non-volatile digital correction data for the transducer, and a microcontroller 42 for providing the digital signals needed to control the digital storage device, to communicate with external digital signal processing systems, and to apply the necessary corrections to the analog input signal via digital-to-analog circuitry 44. Transducer interface circuitry 26 is also shown with digital signal conditioning circuitry 46 and digital power conditioning circuitry 48 connected between microcontroller 42 and connector 32, a low pass filter 50 receiving a time-varying pulse width modulated (PWM) signal from the microcontroller, and an optional jumper 52 used by the manufacturer during programming to transmit a programming voltage (PROG) from the connector to the microcontroller. A crystal oscillator 54 generates the sample clock for analog-to-digital converter 38 and can be used to generate the clock for switched capacitor filters in the analog signal conditioning circuitry 36 and microcontroller 42.

Figure 9:
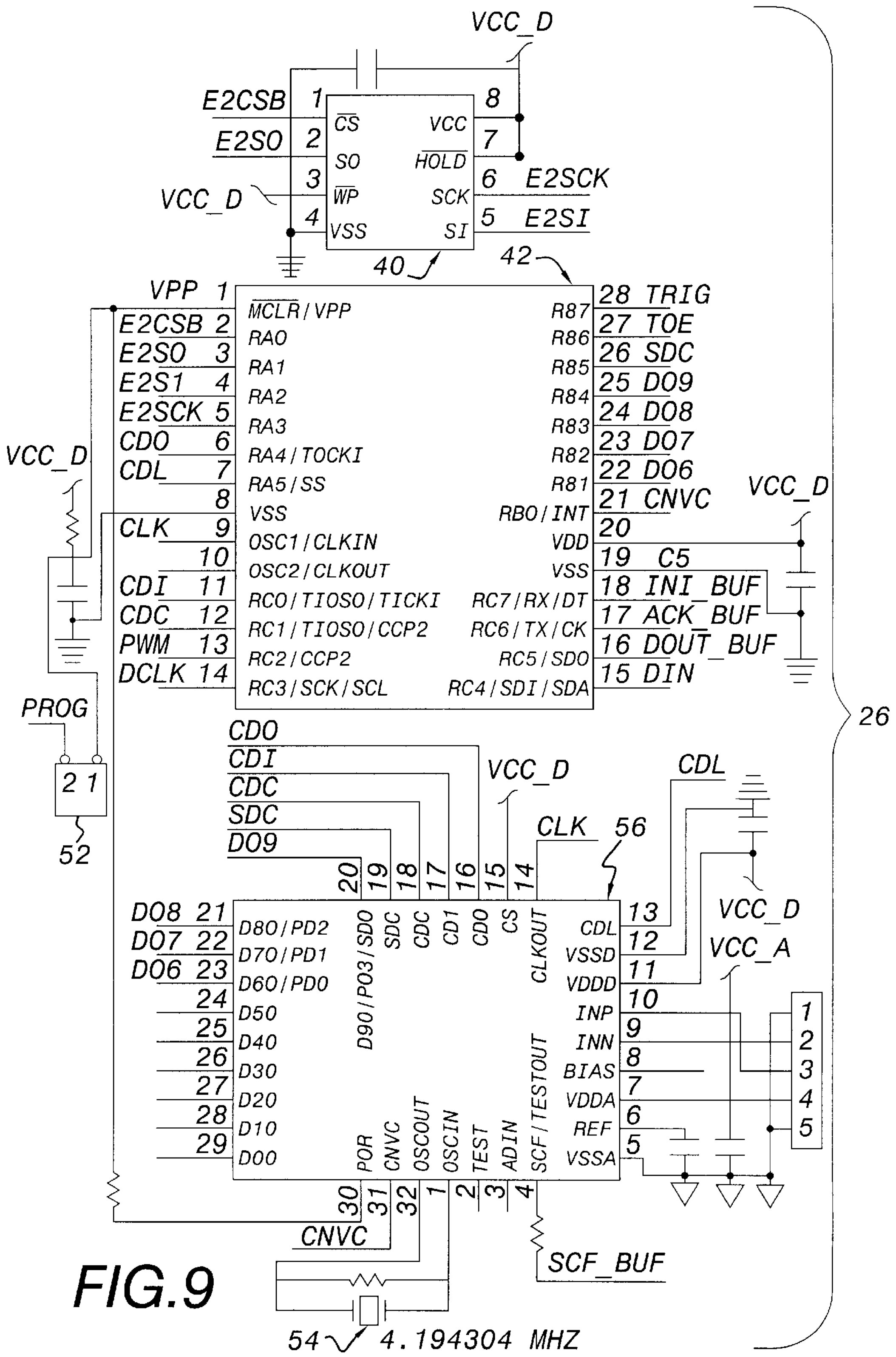
FIG. 9 is an electrical schematic of transducer interface circuitry for the transducer assembly according to the present invention.

Analog signal conditioning circuitry 36, analog-to-digital converter 38 and digital-to-analog circuitry 44 are preferably implemented as an application specific integrated circuit (ASIC) 56 such as, for example, the model EDM710 ASIC from Electronics Development Corporation of Columbia, Md., which is shown in FIG. 9 and described in U.S. patent application Ser. No. 08/949,284, filed on Oct. 21, 1997, the disclosure of which is incorporated herein by reference. Briefly, the ASIC described in the aforementioned patent application includes analog signal conditioning circuitry in the form of digitally-controlled gain and filtering stages, analog-to-digital conversion, a crystal oscillator circuit, a temperature sensor, a digital input/output (I/O) interface and power on reset open collector output. The gain stage of the aforementioned ASIC includes an instrumentation amplifier with a selectable gain of 3 or 23 dB. Offset correction in the aforementioned ASIC is implemented with a 4-bit coarse adjust digital-to-analog converter (DAC) and a 7-bit fine adjust DAC controlling the instrumentation amplifier reference voltage. The coarse adjustment allows compensation of sensor-to-sensor offset variations. The fine adjustment allows compensation of temperature-induced variations. The filtering stages of the aforementioned ASIC include a low pass filter in the form of a 4-pole butterworth filter constructed with switch capacitor technology allowing cut-off frequency variation from about 15 to about 1950 Hz with a 4 MHz oscillator. The analog-to-digital conversion in the aforementioned ASIC is a 10-bit successive approximation register (SAR) having a maximum sampling rate of about 32 kHz and is adjustable from 2× to 16× over sampling based on the cutoff frequency of the low pass filter. The digital I/O interface of the aforementioned ASIC is configured to receive a 32-bit configuration data word (CDW) from the microcontroller through a synchronous serial port which is latched at the completion of an analog-to-digital conversion. An asynchronous latch input for the CDW is provided to indicate when the full CDW has been sent and may be latched.

Microcontroller 42 is shown in FIG. 9 as a PIC16C63 microcontroller from Microchip Technology, Inc., of Chandler, Ariz., but can be any type of suitable microcontroller dependent upon the functions to be performed and criteria such as, for example, processing speed, power consumption, and the memory requirements of the application. Non-volatile memory, such as EPROM, in microcontroller 42 can be used to store the logic needed to communicate with digital storage device 40 and to perform signal processing of the digital data from ASIC 56. In addition, the digital logic needed to comply with the IEEE 1451.2 standard can be stored in non-volatile memory in the microcontroller. Temporary data storage can be provided by the internal random access memory (RAM) of the microcontroller. It will be appreciated, however, that the firmware and temporary data can be stored elsewhere.

Digital storage device or memory 40 is shown in FIG. 9 as a model 25C320, 32 Kb electrically-eraseable programmable read-only memory (EEPROM), but can be any type of suitable digital storage or memory device. Memory 40 provides non-volatile storage for digital transducer data such as the transducer electronic data sheet (TEDS) defined in the IEEE 1451.2 standard. For example, memory 40 can be used to store data describing the transducer assembly as a whole including a unique identifier, revision levels, extensions, worst-case timing values, and the number of channels. Data describing the functioning of each transducer channel, such as correction and calibration data, can also be stored in memory 40 for use by the transducer interface circuitry or an external digital signal processing system. In addition, memory 40 can store a configuration data word (CDW) for the ASIC, for example as described in the aforementioned U.S. patent application Ser. No. 08/949,284. The amount of non-volatile storage needed will depend on the amount of data being stored but is preferably between about 2 Kb and about 4 Kb.

As mentioned above, cable 16 provides a permanent connection between transducer 12 and connector assembly 14 such that the information about the transducer stored in memory 40 is inseparable from the transducer, thereby ensuring traceability of the transducer assembly and enabling plug-and-play operation with a variety of external digital signal processing systems. In the case of the accelerometer 18 shown in FIGS. 1–7, the analog cable includes only four wires. As shown at junction 42 in FIG. 9, the shielding and one wire of cable 16 go to ground while the remaining three wires connect with pins 7, 9 and 10 of ASIC 56 to carry power (VDDA) to the transducer from the ASIC as well as positive and negative inputs (INP and INN) from the transducer to the ASIC, respectively.

Pin connections between the particular microcontroller and ASIC shown in FIG. 9 are described in detail in the aforementioned U.S. patent application Ser. No. 08/949,284; however, it can be seen in FIG. 9 that crystal oscillator 54 is connected between pins 1 and 32 (labelled OSCIN and OSCOUT) of ASIC 56 for use in generating the master clock (CLK) signal on the ASIC, which signal is transferred from pin 14 of the ASIC to pin 9 of the microcontroller. In the embodiment shown, the crystal oscillator has a frequency of about 4.194304 MHz and is connected in parallel with a 1M Ohm resistor to provide feedback for the oscillator loop. Digital data from the microcontroller to the ASIC is transmitted over several data lines established between the chip select (CS), configuration data in (CDI), configuration data out (CDO), configuration data clock (CDC), and configuration data latch (CDL) pins, respectively, of the microcontroller and the ASIC. The analog-to-digital converter data output is preferably transferred from the ASIC to the microcontroller over data lines established between the chip select (CS), sampled data out clock (SDC), data out 0–9 (DO0–DO9) and conversion complete (CNVC) pins, respectively, of the ASIC and the microcontroller.

Figure 10:
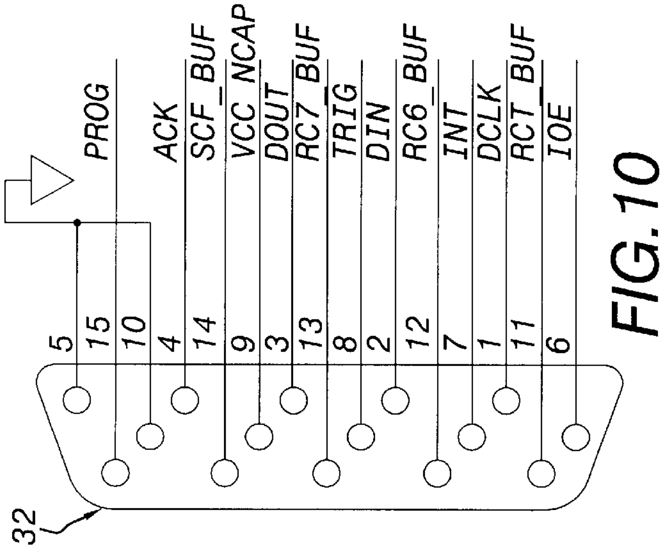
FIG. 10 is a schematic view of a multi-pin digital connector for use with the transducer assembly according to the present invention.

Connector 32 provides a physical connection between the transducer interface module 26 and external digital signal processing systems. As mentioned above, connector 32 preferably includes fifteen contacts. Ten of the contacts are preferably arranged in accordance with the IEEE 1451.2 standard, for example as shown in FIG. 10. Referring still to FIG. 10, it can be seen that pin 1 carries the data clock (DCLK) signal, pin 2 carries the data in (DIN) signal from the external digital signal processing system to the transducer interface circuitry, pin 3 carries the data out (DOUT) signal from the transducer interface circuitry to the external digital signal processing system, pin 4 carries the acknowledge (NACK) signal, pin 5 provides a common ground (COMMON), pin 6 carries the input/output enable (NIOE) signal which signals that the data transport is active, pin 7 carries the interrupt (NINT) signal which is used by the transducer interface circuitry to request service from the external digital signal processing system, pin 8 carries the trigger (NTRIG) signal, pin 9 carries the power (VCC) from the external digital signal processing system, and pin 10 carries the smart transducer interface module or STIM detect (NSDET) signal which is used by the data acquisition and control equipment to detect the presence of a transducer assembly. Pins 11–13 of the digital connector are auxiliary input/output pins which are currently not used but can be connected to corresponding pins on microcontroller 42 to perform various user-defined functions. Referring to FIGS. 9 and 10, it can be seen that pin 14 of connector 32 connects to pin 4 of ASIC 56 to carry the switched capacitor filter output (SCF) from the ASIC to the external digital signal processing system, and that pin 15 of the connector connects to pin 1 of microcontroller 42 via the optional jumper to apply a programming voltage (PROG) to the microcontroller to enable the programming mode. Pin 30 of ASIC 56 is also connected to pin 1 of microcontroller 42 to supply a power on reset (POR) signal at start-up to delay sampling and digital processing until the analog signal conditioning circuitry warms up.

Figure 11:
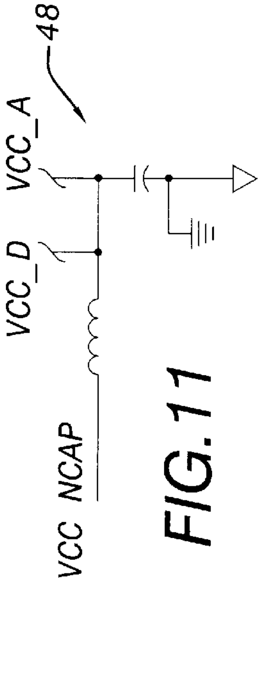
FIG. 11 is a schematic of a digital power conditioning circuit for use with the transducer assembly according to the present invention.

Digital power conditioning circuitry 48 is connected between pin 9 of digital connector 32 and the transducer interface circuitry to permit live insertion and removal (i.e., hot-swapping) of the transducer assembly without damaging microcontroller 42. An exemplary digital power conditioning circuit 48 is shown in FIG. 11 and includes a 10 $\mu$H inductor tied to a 100 $\mu$F capacitor to ground.

Figure 12:
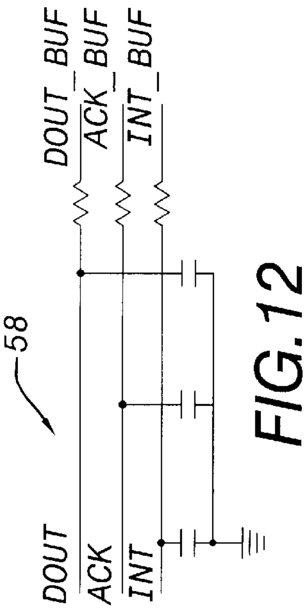
FIG. 12 is a schematic of a digital input signal conditioning circuit for use with the transducer assembly according to the present invention.
Figure 13:
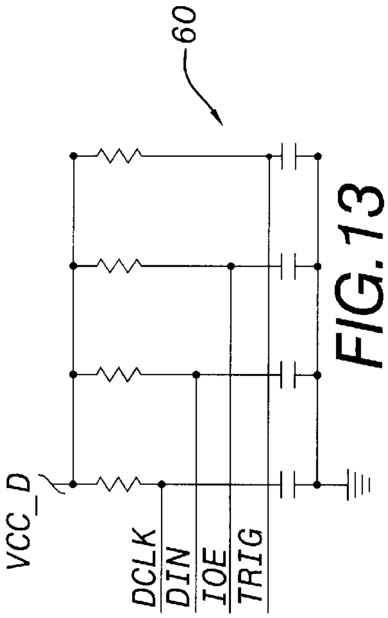
FIG. 13 is a schematic of a digital output signal conditioning circuit for use with the transducer assembly according to the present invention.

For output signals from the transducer interface circuitry, digital signal conditioning circuitry 46 includes a digital input signal conditioning circuit 58 connected between pins 3, 4 and 7 (i.e., the DOUT, ACK and INT pins) of the connector 32 and pins 16, 17 and 18 (i.e., the DOUT BUF, ACK BUF and INT BUF pins) of the microcontroller 42. An exemplary digital input signal conditioning circuit 58 is shown in FIG. 12 and includes a 100 Ohm isolation resistor and a 100 pF capacitor to ground for each line. For input signals to the transducer interface circuitry, digital signal conditioning circuitry 46 includes a digital output signal conditioning circuit 60 connected to pins 1, 2, 6 and 8 (i.e., the DCLK, DIN, IOE and TRIG pins) of connector 32. An exemplary digital output signal conditioning circuit 60 is shown in FIG. 13 and includes a 10K Ohm pull-up resistor and a 100 pF capacitor to ground for each line.

Figure 14:
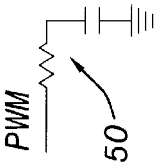
FIG. 14 is a schematic of a low pass filter for use with the transducer assembly according to the present invention.

Low pass filter 50 is connected to the pulse width modulated (PWM) output from microcontroller 42 and is shown in FIG. 14 as an R-C circuit having a 10K Ohm resistor in series with a 0.1 mF capacitor to ground, the resistor and capacitor being picked to provide a desired cut-off frequency of the filter.

The program data or firmware used by microcontroller 42 to communicate with the external digital signal processing system in accordance with the IEEE 1451.2 standard, as well as with memory 40 and ASIC 56, can be written to the microcontroller memory by connecting transducer assembly 10 to a personal computer or other digital processing system and applying a programming voltage (PROG) to the microprocessor via jumper 52. With microcontroller 42 in programming mode, the computer system can write the program data to the non-volatile memory of the microcontroller using pins 8 and 6 of the connector 32 shown in FIG. 10. In accordance with the IEEE 1451.2 standard, digital transducer data, such as the TEDS, can be loaded into the external digital signal processing system and written to non-volatile memory in the transducer interface circuitry 26 by the external digital signal processing system during a separate programming procedure. The digital transducer data is stored in non-volatile memory 40 within connector 14 and is thus inseparable from transducer 12 which is permanently affixed to the connector by cable 16.

If transducer 12 includes a sensor, the sensor is placed in the field to monitor or sense a physical condition or stimulus, such as acceleration, and the smart connector assembly 14 is connected to an external digital signal processing system (i.e., data acquisition equipment) located remotely of the transducer by inserting plug 32 into a mating receptacle carried by the external digital signal processing system. Transducer assembly 10 is easily detached from the data acquisition equipment in response to manual pressure. If desired, therefore, screws 34 can be inserted into threaded holes formed in the data acquisition equipment and tightened to prevent the transducer assembly from becoming accidentally dislodged. Upon connecting the transducer assembly to the data acquisition equipment, the data acquisition equipment looks for the NSDET line (pin 10 of the connector 32 shown in FIG. 10) to be grounded indicating the presence of a smart transducer interface module. If the NSDET line is grounded, the digital data acquisition equipment supplies power to transducer interface circuitry 26 (e.g., via pin 9 of connector 32 and digital power conditioning circuit 48) and reads the digital transducer data, such as the TEDS, stored in non-volatile memory 40 within the transducer interface circuitry. More specifically, the data acquisition equipment will clock a functional address into the transducer interface circuitry using the DIN and DCLK signal lines and will look for the digital transducer data on the DOUT line. Using the digital transducer data, the data acquisition equipment will determine that the transducer includes a sensor and will trigger the transducer interface circuitry 26 to begin taking data from the sensor. As described in the aforementioned U.S. patent application Ser. No. 08/949,284, microcontroller 42 controls the gain and filter settings of analog signal conditioning circuitry 36 and the sample rate of analog-to-digital converter 38 by sending a configuration data word (CDW) to the ASIC 56. Analog-to-digital converter 38 provides microcontroller 42 with a 10-bit digital representation of the conditioned analog signal after the gain and filter stages. The conditioned digital signal is then transmitted from microcontroller 42 to the data acquisition equipment via connector 32. The data acquisition equipment may then convert the conditioned digital signal to a floating point number in engineering units or perform additional gain and offset corrections in the digital domain using correction coefficients retrieved from transducer interface memory 40.

The clock for microcontroller 42 is supplied by ASIC 46 which also supplies an auxiliary reset signal that is tied to the main reset and programming voltage of the microcontroller. If the signal conditioning circuitry includes a switched capacitor filter, the switched capacitor filter output can optionally be tied to one pin of connector 32 for test purposes.

Figure 15:
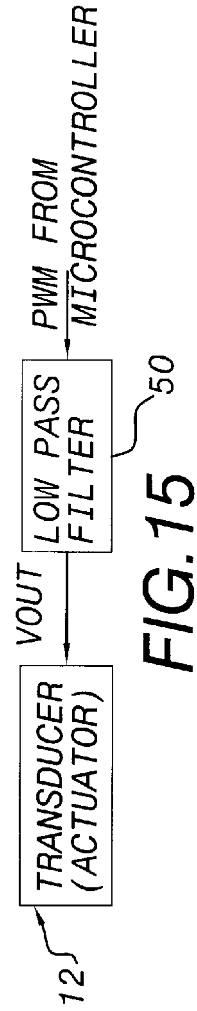
FIG. 15 is a schematic block diagram of a modification of the transducer interface circuitry for the transducer assembly according to the present invention.

If the transducer includes an actuator, the filtered output from low pass filter 50 can be used to control the actuator as shown in FIG. 15 rather than going to ground as shown in FIG. 8. More specifically, the pulse width modulation (PWM) output from pin 13 of microcontroller 42 can be routed through the low pass filter to obtain an analog voltage output (VOUT) that is proportional to the period or frequency of the digital PWM output and thus suitable for use as an input to an actuator. In operation, the transducer assembly 10 is programmed and connected to an external digital signal processing system (i.e., a digital control system) as described above. Upon powering up, the digital control system will clock a functional address into the transducer interface circuitry using the DIN and DCLK signal lines and will look for the digital transducer data on the DOUT line. Using the digital transducer data, the digital control system will determine that the transducer includes an actuator and will generate a calibrated and corrected digital output signal which is sent to microcontroller 42 and converted to a PWM output for low pass filtering in order to obtain an analog control signal for the actuator.

From the above, it will be appreciated that transducer assembly 10 can be switched between multiple external digital signal processing systems without the need of having to manually enter information about the transducer each time the transducer assembly is connected to a new external digital signal processing system. This eliminates many of the errors associated with manually entering transducer information and reduces the time needed to swap-out transducers, which is particularly important if a large number of transducers are used in a system. Moreover, since the transducer interface circuitry is disposed within the connector, the transducer assembly can be fabricated using standard, off-the-shelf transducers and analog cables.

Figure 16:
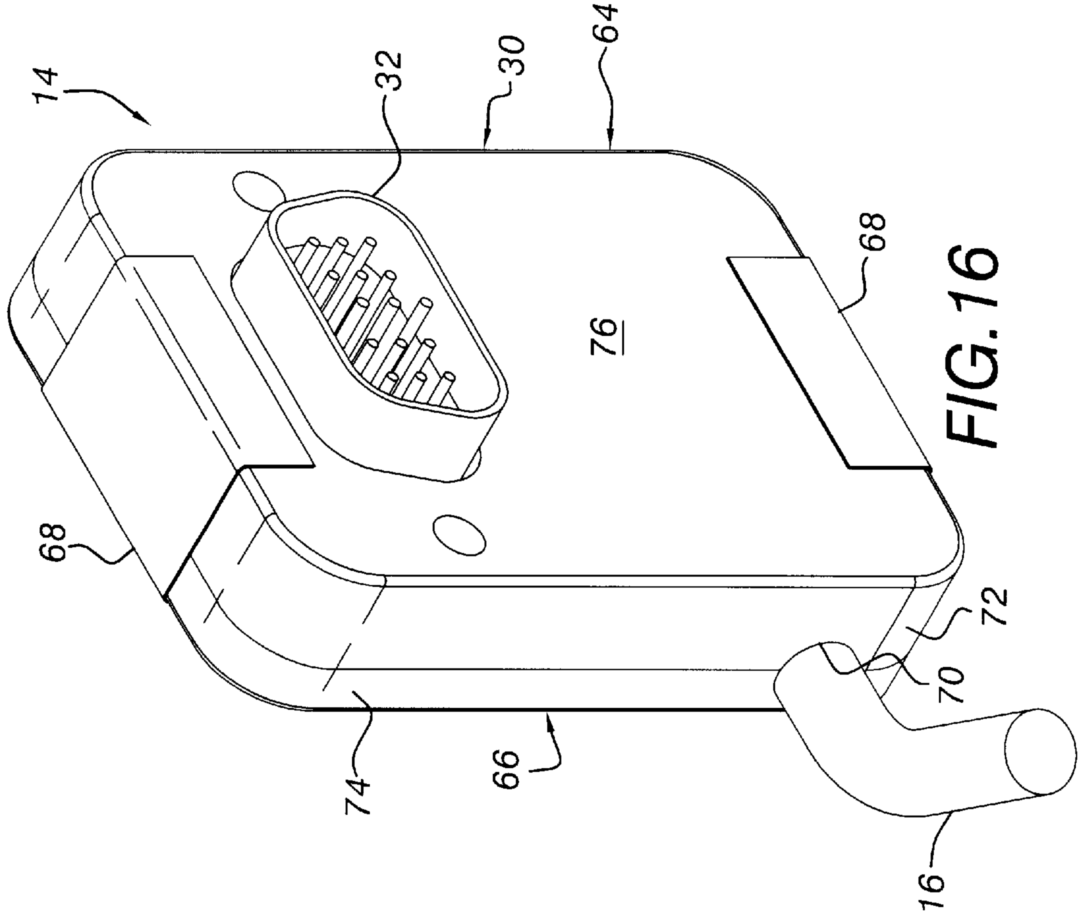
FIG. 16 is a perspective view of a modification of a connector assembly for use with the transducer assembly according to the present invention.

A modified connector assembly for use with the transducer assembly according to the present invention is shown in FIG. 16 at 14. The modified connector assembly 14 is similar to the connector assembly described above but with a plastic housing 30 made up of mating portions 64 and 66 held together by spring clips 68. Cable 16 extends through an opening 70 defined between sidewalls 72 and 74 of the housing portions and is held in compression therebetween to provide strain relief. Digital connector 32 protrudes from a front surface or face 76 of housing 30 which is oriented perpendicularly relative to the sidewalls through which cable 16 extends. The connector 32 is oriented parallel to the longitudinal axis of cable 16 but in laterally spaced relation thereto. Positioning cable 16 and connector 32 on adjacent, perpendicular surfaces or sides of housing 30 results in a connector having a slimmer profile when connected to external digital signal processing systems. Another advantage of the modified connector assembly shown in FIG. 16 is that it is simple to manufacture and convenient for building prototypes due to the ease of assembly and disassembly of the connector housing. Although it is preferred that the transducer interface circuitry be disposed within the connector housing in a non-removable manner to maintain traceability of the digital transducer data, the transducer interface circuitry is not accessible from outside the two-part housing shown in FIG. 16 and cannot, therefore, be removed without disassembling the entire connector housing. If desired, however, the transducer interface circuitry can be potted or otherwise fixed within the housing, for example by filling the space between the housing portions with a potting material or utilizing an adhesive.

Figure 17:
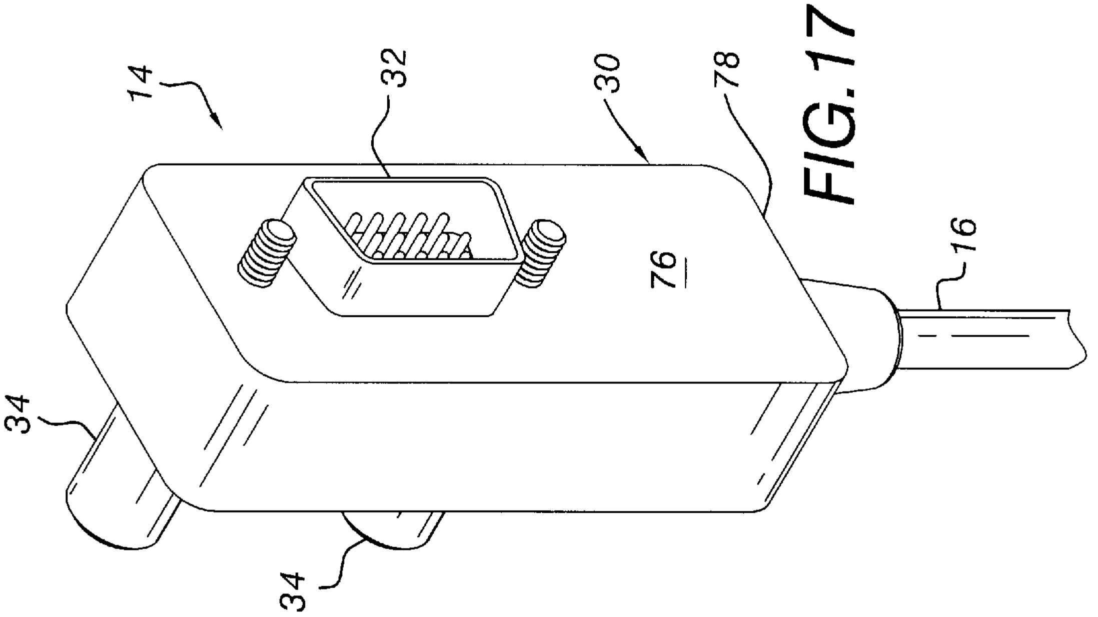
FIG. 17 is a perspective view of a modified connector assembly for the transducer assembly according to the present invention.
Figure 18:
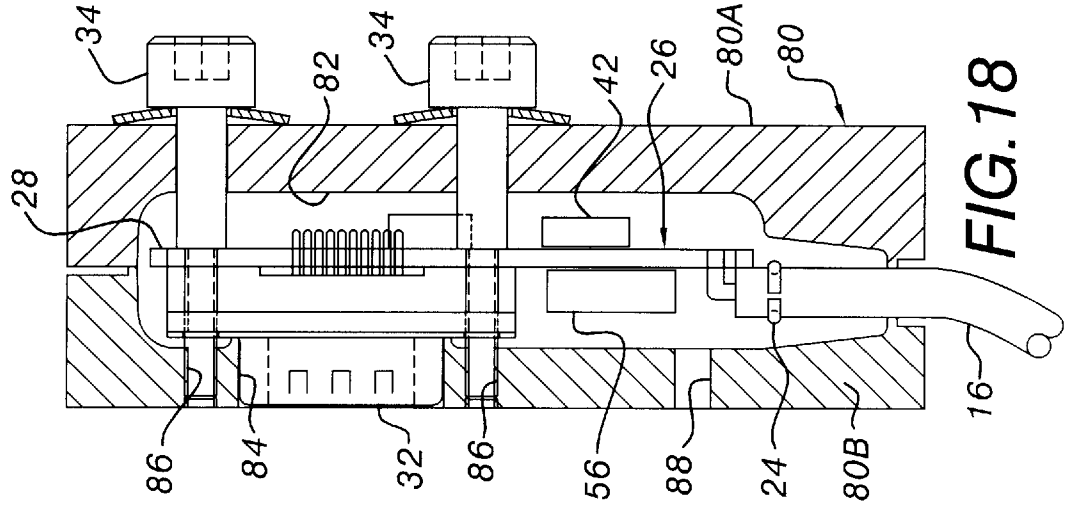
FIG. 18 is a sectional view of a mold used to fabricate the modified connector assembly of FIG. 17.

Another modification of a smart connector assembly for use with the transducer assembly according to the present invention, illustrated in FIG. 17 at 14, is similar to the connector assembly shown in FIG. 16 but with connector housing 30 molded around transducer interface circuitry 26. Connector 32 protrudes from the front surface or face 76 of housing 30 but is essentially colinear with cable 16, which extends from a sidewall 78 of the housing. A mold 80 for encapsulating transducer interface circuitry 26 within a connector housing 30 is shown in FIG. 18. Mold 80 includes opposed portions 80*a*, 80*b* defining a cavity 82 in the shape of the connector housing, with openings 84 and 86 for the connector 32 and mounting screws 34, respectively, and a fill-hole 88. Transducer interface circuitry 26 is mounted on a printed circuit board 28 that fits within cavity 82 and is held in place by inserting connector 32 into opening 84 and screws 34 into openings 86. A terminal end of cable 16 is fixed to board 28 by a cable wrap 24 as described above, and a polymeric housing material is injected into cavity 82 via fill-hole 88 to encapsulate the terminal end of the cable and the transducer interface circuitry therein so that the transducer interface circuitry cannot be removed or otherwise accessed from outside the connector housing.

From the above, it will be appreciated that the transducer assembly according to the present invention allows a transducer to be linked with digital transducer data, such as transducer identification, configuration settings and calibration or correction factors, such that the data cannot be separated from the transducer. This allows the transducer assembly to be switched between multiple external digital signal processing systems without the need of having to manually enter information about the transducer each time the transducer assembly is connected to a new external digital signal processing system. In addition, by storing the transducer data in the connector assembly, the size and mass of the transducer can be minimized while at the same time eliminating the need for digital signals to be communicated between the transducer and the connector assembly.

As mentioned above, the transducer can include a sensor or an actuator, where by "sensor" is meant a device which provides an analog electrical signal in response to a physical stimulus and by "actuator" is meant a device which causes physical movement or a change in the physical condition of an object in response to an analog electrical signal. The sensor or actuator can be mounted on a circuit board within a transducer housing as shown, or provided in any other convenient configuration. While the transducer assembly is described and shown as including one transducer, it will be appreciated that the transducer assembly can include multiple transducers if desired.

The transducer interface circuitry can have one or more channels which are multiplexed to a single ADC or fed to separate ADCs. If desired, one channel can include a temperature sensor to facilitate correction of the analog signal due to temperature variations. The transducer interface circuitry can be implemented as a multichip device as shown or as a single chip to improve cost effectiveness, speed and reliability. The analog signal conditioning circuitry and ADC can be implemented as a single application-specific integrated circuit (ASIC) as shown or in any other suitable form including, but not limited to, multiple ASICs, one or more field-programmable gate arrays, programmable logic arrays or as discrete components. If multiple ASICs are employed, an external sample clock can be used to synchronize the ASICs. The analog signal conditioning circuitry can include various types of amplifiers and filters. Gain and offset corrections can be implemented in the analog domain by the analog signal conditioning circuitry, in the digital domain by the external digital signal processing system, or in both the analog and digital domains. If implemented in the analog domain, the gain and offset corrections can be controlled by the microcontroller as described in the aforementioned U.S. patent application Ser. No. 08/949,284. If implemented in both the analog and digital domains, any change in the signal gain or offset made in the analog domain should be accounted for in determining the digital correction data (e.g., in the TEDS) insofar as such corrections in the analog domain made by the analog signal conditioning circuitry affect corrections in the digital domain made by the external digital signal processing system. Data output by the transducer interface circuitry may be in integer, single precision real or double precision real formats, or in any other useful format.

The microcontroller can be implemented as a single chip as shown, as multiple chips or in any other suitable form including, but not limited to, multiple ASICs, one or more field-programmable gate arrays, programmable logic arrays or as discrete components. While a commercially available microcontroller chip with on-board memory is disclosed, it will be appreciated that a microcontroller without any on-board memory can be used.

Digital storage device 40 can be a magnetic or optical storage device or a semiconductor memory device such as, for example, a standard read-only memory chip, a programmable read-only memory chip, an electrically erasable programmable read-only memory chip, or any combination of the above. If desired, more than one digital storage device can be used to store the digital transducer information. As mentioned above, firmware or program data can be stored in the microcontroller memory or anywhere else in the connector assembly including digital storage device 40. Similarly, any temporary data used by the microcontroller can be stored in random access memory in the microcontroller or in a separate random access memory device elsewhere in the connector assembly.

The connector housing can be solid or hollow and have any convenient shape including, but not limited to, cylindrical and rectangular box-like shapes. In addition, the connector housing can be formed of any suitable material including, but not limited to, plastic, rubber and metal materials. Although it is preferred that the transducer interface circuitry be disposed within the connector housing in a non-removable manner to ensure traceability of the digital transducer data, there may be circumstances where it is permissible to mount the transducer interface circuitry within the connector housing in a removable manner so long as it is not physically accessible from outside the housing without disassembling the housing. If disposed within a hollow housing, the transducer interface circuitry is preferably potted or otherwise fixed within the housing, for example by filling the space inside the housing with a potting material or utilizing an adhesive. Alternatively, the connector housing can be molded around the transducer interface circuitry.

The digital connector carried by the connector housing can have any suitable configuration for mating with the digital data acquisition or control equipment. The digital connector can be a plug or a receptacle with contacts in the form of pins, sockets, pads or any other suitable mating components. Any number of contacts can be used dependent upon the application, and the contacts can be arranged in any useful configuration including, but not limited to, standard fifteen-pin subminiature D-shell configurations wherein the pins are arranged in three rows of five pins within a tubular sleeve of generally trapezoidal configuration. The contacts can be oriented in any direction relative to a longitudinal axis of the cable including, but not limited to, orientations wherein connections are made at right angles to the cable direction and orientations wherein connections are made parallel with the cable direction.

The cable connecting the transducer and the connector assembly can be a standard shielded cable with four wires or any other type of analog cable having one or more wire conductors disposed within a flexible or bendable sleeve allowing the connector assembly to be moved relative to the transducer to facilitate connection with a remote digital signal processing system.

The transducer assembly can receive operating power from the external digital signal processing system, from an internal power source such as a battery or solar cell, from an external power source, or by some combination of the above.

The external digital signal processing system can be a data acquisition system in the case of a sensor or a control system in the case of an actuator. In addition, the digital application processor can be a network capable application processor (NCAP) in accordance with the IEEE 1451.1 and 1451.2 standards, the contents of which are incorporated herein by reference. Some examples of a NCAP include, but are not limited to, a network hub, a local area network or a wide area network such as the internet.

The pin assignments shown and described above for the microcontroller and the ASIC are merely exemplary and will depend on the design of the particular integrated circuits employed in the transducer interface circuitry. It will also be appreciated that any specific values of resistance, capacitance, or inductance shown or described above are merely exemplary and not meant to be limiting.

Inasmuch as the present invention is subject to many variations, modifications and changes in detail, it is intended that all subject matter discussed above or shown in the accompanying drawings be interpreted as illustrative only and not be taken in a limiting sense.

What is claimed is:

1. A transducer assembly for connection with an external digital signal processing system, said transducer assembly comprising:

an analog transducer;

a digital connector assembly movable relative to said analog transducer to facilitate connection with the digital signal processing system; and a cable permanently affixed between said analog transducer and said digital connector assembly to convey an analog signal therebetween;

wherein said digital connector assembly includes:

a connector housing;

a digital connector mounted by said connector housing to mate in a detachable manner with the digital signal processing system; and transducer interface circuitry disposed within said connector housing in a non-removable manner and including:

a digital storage device programmed to hold digital calibration and correction data for said transducer;

a microprocessor for retrieving said calibration and correction data from said digital storage device and generating digital corrections; and signal conditioning circuitry for receiving an analog transducer signal from said analog transducer and said generated digital corrections from said microprocessor and for applying said generated digital corrections to said analog transducer signal to produce a conditioned transducer signal for transmission to the digital signal processing system.

2. A transducer assembly as recited in claim 1 wherein said transducer includes a sensor providing said analog transducer signal and said interface circuitry further includes an analog-to-digital converter receiving said conditioned transducer signal from said signal conditioning circuitry and transmitting a conditioned digital transducer signal to the digital signal processing system via said digital connector.

3. A transducer assembly as recited in claim 1 wherein said transducer includes an actuator responsive to an analog transducer control signal and said interface circuitry further includes a converter receiving a digital transducer signal from the digital signal processing system via said digital connector and converting said digital transducer signal to said analog transducer control signal.

4. A transducer assembly as recited in claim 1 wherein said transducer includes an actuator and said microprocessor is configured to generate a pulse width modulated signal, and further comprising a low pass filter disposed in said connector housing for receiving said pulse width modulated signal and generating an analog voltage output which is supplied to said actuator as an input.

5. A transducer assembly as recited in claim 1 wherein said digital connector assembly includes circuitry for supplying power to said transducer interface circuitry from the external digital signal processing system.

6. A transducer assembly as recited in claim 5 wherein said transducer interface circuitry includes circuitry for delaying signal conditioning operations for a predetermined time after power is applied to said transducer interface circuitry via said power supplying circuitry.

7. A transducer assembly as recited in claim 5 and further comprising circuitry disposed within said housing for conditioning said power supply to permit live insertion and removal of said transducer assembly without damaging said microprocessor.

8. A transducer assembly as recited in claim 1 wherein said digital connector assembly includes circuitry for indicating the presence of said transducer interface circuitry.

9. A transducer assembly as recited in claim 1 wherein said digital connector assembly includes circuitry for supplying a programming voltage to said microprocessor from the external digital signal processing system.

10. A transducer assembly as recited in claim 1 wherein said signal conditioning circuitry includes a low pass filter and wherein said digital connector assembly includes circuitry for receiving a filtered analog transducer signal from said low pass filter and supplying said filtered analog transducer signal to the external digital signal processing system.

11. In a transducer assembly for connection with an external digital signal processing system and including an analog transducer, a digital connector assembly movable relative to said analog transducer to facilitate connection with the digital signal processing system and a cable affixed between said analog transducer and said digital connector assembly to convey an analog signal therebetween, wherein said digital connector assembly includes interface circuitry having a digital storage device, a microprocessor and signal conditioning circuitry, a method of processing a transducer signal within said digital connector assembly to provide a conditioned signal to said external digital processing system comprising the steps of:

(a) storing digital calibration and correction data for said transducer in said digital storage device;

(b) retrieving said calibration and correction data from said digital storage device and generating digital corrections via said microprocessor; and (c) receiving an analog transducer signal from said analog transducer and said generated digital corrections from said microprocessor and applying said generated digital corrections to said analog transducer signal, via said signal conditioning circuitry, to produce a conditioned transducer signal for transmission to the digital signal processing system.

12. The method of claim 11 wherein said transducer includes a sensor providing said analog transducer signal and said interface circuitry further includes an analog-to-digital converter, and wherein step (c) further includes:

(c.1) receiving said conditioned transducer signal from said signal conditioning circuitry via said analog-to-digital converter to transmit a conditioned digital transducer signal to the digital signal processing system via said digital connector assembly.

13. The method of 11 wherein said transducer includes an actuator responsive to an analog transducer control signal and said interface circuitry further includes a converter, and step (c) further includes:

(c.1) receiving a digital transducer signal from the digital signal processing system via said digital connector assembly and converting said digital transducer signal to said analog transducer control signal via said converter.

14. The method of claim 11 wherein said transducer includes an actuator and said microprocessor is configured to generate a pulse width modulated signal, and wherein step (c) further includes:

(c.1) receiving said pulse width modulated signal and generating an analog voltage output which is supplied to said actuator as an input via a low pass filter disposed in said interface circuitry.

15. The method of claim 11 wherein step (a) further includes:

(a.1) supplying power to said transducer interface circuitry from the external digital signal processing system via said digital connector assembly.

16. The method of claim 15 wherein step (a) further includes:

(a.2) delaying signal conditioning operations for a predetermined time after power is applied to said transducer interface circuitry via said digital connector assembly.

17. The method of claim 15 wherein step (a) further includes:

(a.2) conditioning said supplied power to permit live insertion and removal of said transducer assembly without damaging said microprocessor.

18. The method of claim 11 wherein step (a) further includes:

(a.1) indicating the presence of said transducer interface circuitry via said digital connector assembly.

19. The method of claim 11 wherein step (a) further includes:

(a.1) supplying a programming voltage to said microprocessor from the external digital signal processing system.

20. The method of claim 11 wherein said signal conditioning circuitry includes a low pass filter, and wherein step (c) further includes:

(c.1) receiving a filtered analog transducer signal from said low pass filter and supplying said filtered analog transducer signal to the external digital signal processing system via said digital connector assembly.

* * * * *